June 27, 1972   H. O. SCHERENBERG   3,672,798
RADIAL SEALING BAR FOR PISTONS OF ROTARY PISTON
INTERNAL COMBUSTION ENGINES
Filed March 6, 1970

INVENTOR
HANS O. SCHERENBERG

BY Craig, Antonelli,
Stewart & Hill
ATTORNEYS

United States Patent Office 3,672,798
Patented June 27, 1972

3,672,798
RADIAL SEALING BAR FOR PISTONS OF ROTARY PISTON INTERNAL COMBUSTION ENGINES
Hans O. Scherenberg, Stuttgart-Heumaden, Germany, assignor to Daimler-Benz Aktiengesellschaft, Stuttgart-Unterturkheim, Germany
Filed Mar. 6, 1970, Ser. No. 17,128
Claims priority, application Germany, Mar. 6, 1969,
P 19 11 320.3
Int. Cl. F01c *19/02;* F03c *3/00;* F04c *27/00*
U.S. Cl. 418—113
7 Claims

ABSTRACT OF THE DISCLOSURE

A radial sealing bar of composite construction for pistons of rotary piston internal combustion engines, especially of trochoidal construction in which the radial sealing bar consists of at least three thin layers which extend in the longitudinal direction; at least the layer which forms a part of the bar crest is made from a material having a high hardness, such as a ceramic material, quartz, a hard metal or alloy and other sintered materials.

The present invention relates to a radial sealing bar of composite construction for pistons of rotary piston internal combustion engines, especially of trochoidal type of construction.

A radial sealing bar of composite construction is known in the prior art which consists of a body made from carbon and of a metallic base body which surrounds the body of carbonaceous material at the base and at the bar ends. The base body thereby serves exclusively as support body. Furthermore, it has already been proposed in the prior art to utilize radial sealing bars consisting entirely of ceramic materials which, as a result of their great hardness, produce slight friction values and wear values. Ceramic materials and other hard materials, however, have a high modulus of elasticity so that with the radial sealing bar, which is subjected in operation to strong alternating bending stresses, a fatigue failure or fracture occurs already after a short operating period.

The present invention is concerned with the aim to so construct a radial sealing bar of composite construction that it achieves a long length of life together with good operating and running properties.

The underlying problems are solved in accordance with the present invention in that the radial sealing bar is constructed of at least three thin layers extending in the longitudinal direction of the bar whereby at least the layer which forms at least a portion of the bar crest, consists of a material of high hardness, especially of a ceramic material, quartz, conventional hard metal or hard metal alloy, aluminum oxide ($Al_2O_3$) or other sintered materials.

With a construction of the radial sealing bar in accordance with the present invention, the moment of inertia thereof which increases with the third power of the layer thickness, is considerably smaller than with the known radial sealing bars so that a high elasticity is achieved, especially if also layers of a relatively soft material are used. The high elasticity reduces not only the danger of a fatigue fracture but also permits to the radial sealing bar to adapt itself very well to the macroform or macro-structure of the operating surface of the casing. These advantages are connected with slight wear and small friction values since at least a part of the bar crest sliding along the operating surface of the casing consists of a layer of a hard material.

It is possible that the layers are arranged parallel to the base or to the flanks of the radial sealing bar. In connection therewith the individual layers may also consist of the same hard material or of different materials.

In an advantageous type of construction of the present invention, connecting layers made from any suitable, known connecting material are arranged between the layers. The elasticity of the radial sealing bar is further increased by these connecting layers. Furthermore, they equalize differences in the expansion of difference materials and absorb stresses which may occur during the manufacture or during the operation thereof as a result of different temperatures in the radial sealing bar. The manufacture of the composite layers may take place by soldering, gluing, molding, sintering or, especially with ceramic-metal connections, by electron beam welding and melting.

Accordingly, it is an object of the present invention to provide a radial sealing bar for pistons of rotary piston internal combustion engines, especially of trochoidal type of construction which avoids by simple means the aforementioned shortcomings and drawbacks encountered in the prior art.

Another object of the present invention resides in a radial sealing bar for pistons of rotary piston internal combustion engines which assures a long length of life together with good operating characteristics.

A further object of the present invention resides in a sealing bar of the type described above which reduces the moment of inertia while minimizing wear and tear.

These and other objects, features and advantages of the present invention will become more obvious from the following description when taken in connection with the accompanying drawing which shows, for purposes of illustration only, several embodiments in accordance with the present invention, and wherein.

Figure 1:
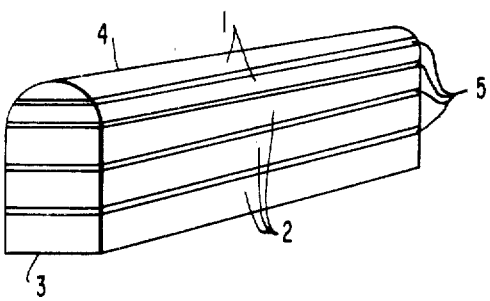
FIG. 1 is a perspective view of a radial sealing bar with layers parallel to the base in accordance with the present invention.

Referring now to the drawing wherein like reference numerals are used throughout the various views to designate like parts, and more particularly to FIG. 1, the radial sealing bar of this figure consists of five layers 1 and 2 which are arranged extending from one bar end to the other and parallel to the base 3. The layer 1 forming the bar crest 4 and the adjacent layer 1 consist of a ceramic material whereas the other three layers 2 consist of a metallic material. The ceramic layers have, corresponding to their higher modulus of elasticity, a smaller thickness than the metallic layers 2 so that all layers 1 and 2 have approximately the same elasticity. Connecting layers 5 of any suitable, known connecting material are arranged between the individual layers 1 and 2 which further increase the elasticity of the radial sealing bar.

Figure 2:
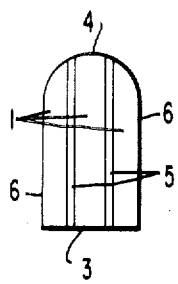
FIG. 2 is an end elevational view of a bar end of a modified embodiment of a radial sealing bar in accordance with the present invention with layers parallel to the bar flanks.

The radial sealing bar illustrated in FIG. 2 consists of three ceramic layers having the same thickness which are arranged parallel to the bar flanks 6. However, it is also possible that only the center layer 1 consists of ceramic material whereas the outer two layers 1 are made from a metallic material. Connecting layers 5 of known connecting material are again arranged between the layers 1. This type of construction of the radial sealing bar has the advantage that with approximately identical thickness of the individual layers as in the embodiment according to FIG. 1 a smaller number of layers is necessitated.

Figure 3:
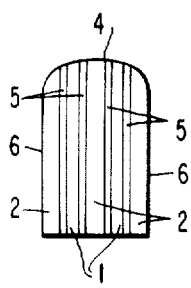
FIG. 3 is an end elevational view, similar to FIG. 2, of a still further modified embodiment of a sealing bar in accordance with the present invention having a different layer distribution.

The radial sealing bar illustrated in FIG. 3 consists of five layers whereby the center and the two lateral layers 2 consist of metal whereas the considerably thinner layers 1 disposed between the same consist of ceramic material. The bar crest 4 is constructed very flat so that the positioned inclination of the radial sealing bar occurring during the operation of the rotary piston internal combustion engine brings about that essentially the layers 1 consisting of ceramic material come into contact with the casing operating surface. As a result thereof, these layers 1 also determine the wear of the radial sealing bar. The connection of the layers 1 and 2 takes place again by way of the connecting layers 5 made of conventional connecting material.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A radial sealing bar of composite construction for pistons of rotary piston internal combustion engines, characterized in that the radial sealing bar is constructed of at least three thin layers extending in the bar longitudinal direction and arranged parallel to the base of the bar, at least the layer forming at least a portion of the bar peak essentially consisting of a material of high hardness having a relatively higher modulus of elasticity, and at least some others of said thin layers disposed below said one thin layer in the direction toward the base having a lower modulus of elasticity than the material of high hardness, and each of said layers extending over substantially the entire width and length of the bar.

2. A radial sealing bar according to claim 1, wherein said material of high hardness is selected from the group consisting of ceramic materials, quartz, hard metals and alloys thereof, aluminum oxide and other sintered materials.

3. A radial sealing bar according to claim 1, characterized in that the entire crest of the bar essentially consists of only a single layer of a material of high hardness.

4. A radial sealing bar according to claim 3, characterized in that some of said thin layers disposed nearer the base of the bar are metallic layers.

5. A radial sealing bar according to claim 1, characterized in that at least some of said other thin layers having a relatively lower modulus of elasticity are connecting layers connecting together layers with relatively higher modulus of elasticity.

6. A radial sealing bar according to claim 5, characterized in that in addition to the connecting layers, some of said thin layers are made from a material with a relatively lower modulus of elasticity.

7. A radial sealing bar according to claim 5, characterized in that the thin layers, other than the connecting layers, are made from a material having the relatively higher modulus of elasticity.

References Cited

UNITED STATES PATENTS

| | | | |
|---|---|---|---|
| 3,245,387 | 4/1966 | Froede | 418—120 |
| 3,263,912 | 8/1966 | Frenzel | 418—121 |
| 3,180,564 | 4/1965 | Fuhrmann et al. | 418—122 |
| 924,773 | 6/1909 | Hanman | 418—115 |
| 3,281,064 | 10/1966 | Springer | 418—179 |
| 3,194,488 | 7/1965 | Fuhrmann | 418—113 |
| 3,300,124 | 1/1967 | Jones | 418—121 |

CARLTON R. CROYLE, Primary Examiner

J. J. VRABLIK, Assistant Examiner

U.S. Cl. X.R.

418—179